US009403698B2

(12) United States Patent
Dennis et al.

(10) Patent No.: US 9,403,698 B2
(45) Date of Patent: Aug. 2, 2016

(54) METHOD AND SYSTEM FOR TREATING PRODUCED WATER

(71) Applicant: Severn Trent Water Purification, Inc., Colmar, PA (US)

(72) Inventors: Richard Dennis, Wesley Chapel, FL (US); Christopher Clark, Madeira Beach, FL (US)

(73) Assignee: De Nora Water Technologies, Inc., Colmar, PA (US)

( * ) Notice: Subject to any disclaimer, the term of this patent is extended or adjusted under 35 U.S.C. 154(b) by 687 days.

(21) Appl. No.: 13/621,355

(22) Filed: Sep. 17, 2012

(65) Prior Publication Data

US 2014/0076817 A1    Mar. 20, 2014

(51) Int. Cl.
| | |
|---|---|
| C02F 1/42 | (2006.01) |
| C02F 1/20 | (2006.01) |
| C02F 1/44 | (2006.01) |
| B01J 39/04 | (2006.01) |
| B01J 41/04 | (2006.01) |
| B01J 47/02 | (2006.01) |
| B01J 49/00 | (2006.01) |

(52) U.S. Cl.
CPC .............. *C02F 1/42* (2013.01); *B01J 39/043* (2013.01); *B01J 39/046* (2013.01); *B01J 41/046* (2013.01); *B01J 47/026* (2013.01); *B01J 49/0017* (2013.01); *B01J 49/0069* (2013.01); *B01J 49/0073* (2013.01); *B01J 49/0086* (2013.01); *C02F 1/20* (2013.01); *C02F 1/441* (2013.01); *C02F 2001/422* (2013.01); *C02F 2001/425* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 2,354,172 A | 7/1944 | Myers et al. | |
| 2,422,821 A | 6/1947 | Bhoota | |
| 3,438,891 A | 4/1969 | Schmidt et al. | |
| 3,492,092 A * | 1/1970 | Higgins | B01J 47/10 210/676 |
| 3,565,798 A * | 2/1971 | Barnes | B01J 47/10 210/140 |
| 3,775,088 A * | 11/1973 | Higgins | C05C 1/00 210/676 |
| 3,969,243 A | 7/1976 | Arion | |
| 4,228,001 A | 10/1980 | Carlson | |
| 4,705,637 A | 11/1987 | Heller et al. | |
| 5,108,616 A | 4/1992 | Kunz | |
| 5,580,445 A | 12/1996 | Iwatsuka et al. | |
| 5,772,891 A | 6/1998 | Yamasaki et al. | |

(Continued)

FOREIGN PATENT DOCUMENTS

| | | |
|---|---|---|
| GB | 1433338 A | 4/1976 |
| JP | 2001-212567 A | 8/2001 |
| WO | 2011140613 A1 | 11/2011 |

OTHER PUBLICATIONS

Cotruvo J, Bartram J, eds. Calcium and Magnesium in Drinking-water: Public health significance, Geneva, World Health Organization, 2009. ISBN:9789241563550 http://www.who.int/water_sanitation_health/publications/publication_9789241563550/en/.*

(Continued)

*Primary Examiner* — Heidi Kelley
*Assistant Examiner* — Eric McCullough
(74) *Attorney, Agent, or Firm* — D'Ambrosio & Menon, PLLC; Usha Menon

(57) ABSTRACT

Embodiments of the present invention provide systems and methods for purifying produced water, comprising a closed loop cation exchange unit, a closed loop anion exchange unit, and an intermediate degasifier.

17 Claims, 5 Drawing Sheets

(56) References Cited

U.S. PATENT DOCUMENTS

| | | | |
|---|---|---|---|
| 6,267,891 | B1 | 7/2001 | Tonelli et al. |
| 6,699,913 | B1 | 3/2004 | Klipper et al. |
| 6,843,920 | B1* | 1/2005 | Darmawan .................... 210/678 |
| 7,273,555 | B2 | 9/2007 | Dennis |
| 7,875,186 | B2 | 1/2011 | Coppola et al. |
| 2002/0166823 | A1* | 11/2002 | Mukhopadhyay ... B01D 61/022 210/806 |
| 2005/0127003 | A1* | 6/2005 | Dennis .......................... 210/662 |
| 2006/0021944 | A1* | 2/2006 | Carson et al. ................. 210/673 |
| 2007/0246406 | A1* | 10/2007 | Dibel .................. B01D 61/142 210/96.2 |
| 2008/0099154 | A1* | 5/2008 | Minnich et al. .............. 159/47.3 |
| 2008/0264866 | A1 | 10/2008 | Spriggs et al. |
| 2009/0071906 | A1* | 3/2009 | Mawle ................. B01J 49/0017 210/677 |
| 2010/0130626 | A1 | 5/2010 | Fukui et al. |
| 2010/0307972 | A1 | 12/2010 | Bratty et al. |
| 2012/0088949 | A1 | 4/2012 | Hussey et al. |
| 2012/0175308 | A1 | 7/2012 | Jangbarwala et al. |

OTHER PUBLICATIONS

North, Michael, Pedro Villuendas, and Carl Young. "A Gas-Phase Flow Reactor for Ethylene Carbonate Synthesis from Waste Carbon Dioxide." Chemistry—A European Journal 15.43 (2009): 11454-1457.*

"Ballast Water Wastewater Treatment Systems on site Hypochlorite Generators" TETRA Higgins Loop; Jun. 25, 2012.

"TETRA Higgins Loop Ion Exchange System" Jun. 25, 2012.

"Remco Engineering Water Systems and Controls" Ion Exchange Systems and Equipment; Jun. 25, 2012.

International Search Report and Written Opinion dated Jan. 29, 2014 for co-pending related PCT patent application No. PCT/US13/54917.

SIPO Office Action dated Nov. 2, 2015 for related co-pending Chinese App. No. Application No. 201380048430.4.

* cited by examiner

METHOD AND SYSTEM FOR TREATING PRODUCED WATER

FIELD OF THE INVENTION

The present invention relates to the purification of produced water, and, more particularly, to the purification of produced water utilizing continuous ion exchange.

BACKGROUND

Water trapped in underground geological formations, and water injected into oil and gas reservoirs to achieve optimal hydrocarbon recovery, may be produced and brought to the surface during the hydrocarbon product recovery process. This produced water may have variable physical and chemical properties. For instance, depending on the geographic location of the reservoir and the particular formation, the sodium content of produced water may be extremely high and its discharge to the environment may be harmful to both plant and animal life.

A primary contaminant in produced water is sodium bicarbonate and/or sodium chloride. The high bicarbonate/carbonate content and overall total dissolve solids (TDS) content adversely affects the environment. A number of countries have enacted regulations prohibiting the untreated discharge of produced water. There is an unmet need for processes that expand options for recycling and reusing produced water, and for creating useful products from produced water.

SUMMARY

Embodiments of the present invention provide methods and systems for purification of produced water.

One or more embodiments of the present invention provide processes for purification of produced water, involving: providing a closed loop cation exchange unit and a closed loop anion exchange unit, the cation exchange unit and the anion exchange unit connected in series through an intermediate degasifier. In one aspect, the produced water may comprise elevated levels of total dissolved solids, Na+, carbonate and Cl⁻ ions.

At least one of the anion exchange unit and the cation exchange unit may operate with continuous counter-current flow.

The cation exchange unit may comprise a cation resin bed, and the anion exchange unit may comprise an anion resin bed. The cation resin bed may be a strong acid cation resin bed, and the anion resin bed may be a weak base anion resin bed. Each of the exchange units may further comprise a plurality of treatment zones, the treatment zones comprising at least an adsorption zone, a rinse zone, a regeneration zone, a pulsing zone and a backwash zone.

The process may further involve flowing a volume of the produced water through the adsorption zone of the cation exchange unit to remove cations comprising Na+ from the produced water and produce an acidic decationized effluent.

In the regeneration zone of the cation exchange unit, the cation exchange unit may regenerated by contacting it with an acid regenerant. The acid regenerant may be selected from a group consisting of: HCl, $H_2SO_4$, $HNO_3$, $H_3PO_4$, $H_2CO_3$, citric acid, methane sulfonic acid, and acetic acid.

The acidic decationized effluent is passed through a degasifier to strip or release carbon dioxide and thereby produce an acidic degasified effluent.

Deionized treated water, having a neutral pH, may be produced by flowing a volume of the acidic degasified effluent through the adsorption zone of the anion exchange unit. Calcium salt may be added to the deionized treated water to buffer it prior to discharge.

In the regeneration zone of the anion exchange unit, the anion resin bed may be regenerated by contacting the anion resin with a caustic regenerant.

In one or more embodiments, the process may further involve rinsing the regenerated anion resin bed in a two-stage process, the process involving: in a first stage, piping a slip stream flow of the acidic degasified effluent through the rinse zone of the anion exchange unit; and, in a second stage, passing a stream of the deionized treated water through the rinse zone of the anion exchange unit.

In one or more embodiments, a residual portion of the acidic degasified effluent and the deionized treated water may be collected and removed through a rinse tail outlet collector in the anion exchange unit. The rinse tail may be positioned within the rinse zone and above a caustic regenerant inlet distributor. The acidic degasified effluent may be recycled from the rinse tail to a feed tank for the cation exchange unit.

In one or more embodiments, the process may further involve an inline process for inhibiting biofouling within the regeneration zone of the anion exchange unit and/or inhibiting biofouling and treating biofoulants within the regeneration zone of the anion exchange unit. The inline process may comprise scrubbing the anion resin bed with a caustic brine solution.

In one or more embodiments, the process may further involve regenerating the cation resin bed by diverting a stream of the acidic degasified effluent, the acidic degasified effluent controlling the evolution of carbon dioxide within the cation resin bed.

In one or more embodiments, upon the condition that the produced water is pre-treated using reverse osmosis (RO) and a RO concentrate is produced, the RO concentrate may be stored in the feed tank and a sufficiently large volume of the deionized treated water may be recycled internally to a produced water feed tank to dilute the RO concentrate. Diluting the RO concentrate may mitigate an excessive evolution of carbon dioxide in the cation exchange unit.

One or more embodiments of the present invention provide systems for purifying produced water, comprising a closed loop cation exchange unit, a closed loop anion exchange unit, and an intermediate degasifier.

In one or more embodiments, the closed loop cation exchange unit may comprise a cation resin bed, and a plurality of treatment zones. The plurality of treatment zones may comprise a cation adsorption zone, a cation rinse zone, a cation regeneration zone, a cation pulse zone and a cation backwash zone.

In one or more embodiments, the closed loop anion exchange unit may comprise an anion resin bed, and a plurality of treatment zones. The plurality of treatment zones may comprise an anion adsorption zone, an anion rinse zone, an anion regeneration zone, an anion pulse zone and an anion backwash zone.

The closed loop anion exchange unit may further comprise a rinse system, the rinse system having means for conveying a plurality of rinse fluids to the anion rinse zone. The fluids may comprise at least acidic degasified fluid and deionized treated fluid. The rinse system may further have a rinse tail for collecting and removing the rinse fluids from the rinse zone. The rinse tail may be disposed above the anion regeneration zone.

DETAILED DESCRIPTION

Available options for produced water disposition include infiltration and containment impoundment, land application disposal, and reinjection. However, these options may not be viable for water balance, environmental or economic reasons.

Reverse osmosis (RO), considered one of the best available technologies for treatment of produced water. However, RO may involve high energy costs which, combined with reinjection of high volumes of concentrate wastewater rejected from the membranes, makes it economic value doubtful.

Conventional adsorption or ion exchange processes may also be used to treat produced waters. However, the combined chemical costs and large spent regenerant waste volumes involved may make these processes uneconomical.

Despite the deficiencies of conventional adsorption or ion exchange processes, at least one type of adsorption/ion exchange process has been determined sufficiently efficient at produced water purification. Continuous ion exchange (CIX) technology, specifically the Higgins Loop™ Continuous Ion Exchange Contactor, has been utilized commercially for several years for produced water purification. In the context of purifying water produced in the coal seam gas (CSG) production process (or oil and gas or hydrocarbon recovery process), for example, this technology utilizes cation resins to remove sodium from the produced water and concentrate it into a very small brine stream for disposal. It also reduces the water's bicarbonate content by evolving carbon dioxide gas from the low sodium water under slightly acidic pH conditions. The purified water is then neutralized with limestone, which increases the purified water's calcium content and makes the water more suitable for use in irrigation, human consumption, ranching, and for aquatic life in rivers and creeks.

The systems and methods of the present invention involve the treatment of produced water utilizing continuous ion exchange. U.S. Pat. No. 7,273,555, discloses processes for continuous countercurrent ion exchange comprising, among other things, piping a contaminated feed stream into a closed-loop cation exchange contactor. This and all other referenced patents and applications are incorporated herein by reference in their entirety. Furthermore, where a definition or use of a term in a reference that is incorporated by reference herein is inconsistent or contrary to the definition of that term provided herein, the definition of that term provided herein applies and the definition of that term in the reference does not apply.

Figure 1:
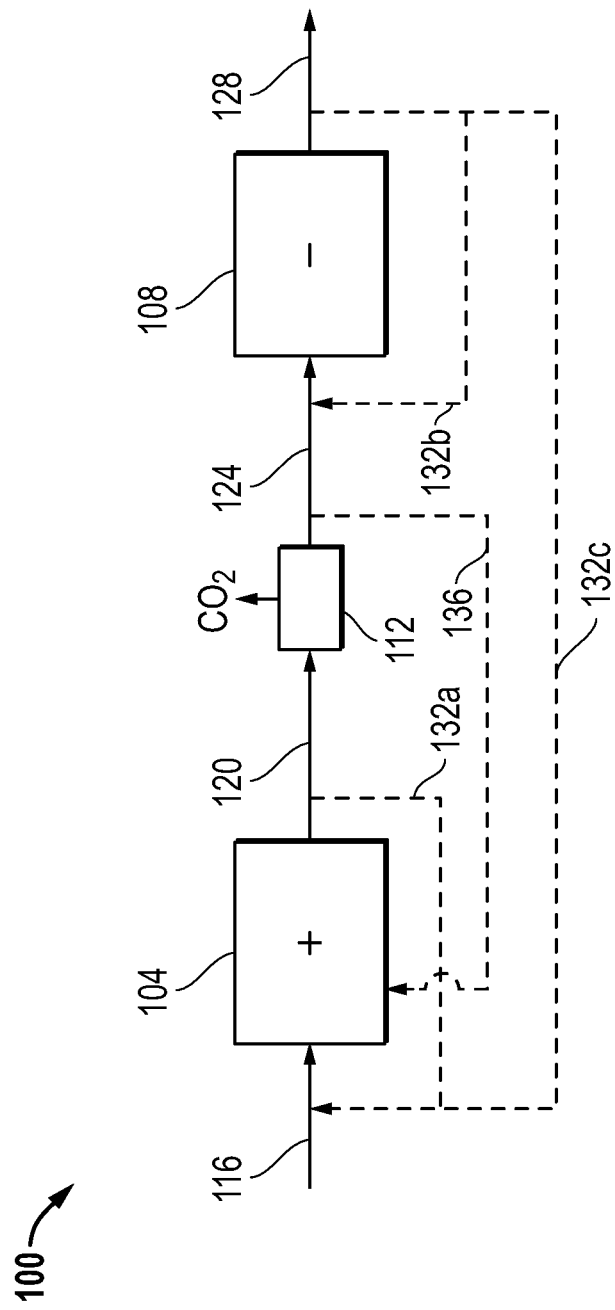
FIG. 1 shows a flow diagram illustrating systems and processes in accordance with one or more embodiments of the present invention.

Referring to FIG. 1, in accordance with one or more embodiments of the present invention, a produced water purification system 100 may comprise a closed-loop cation exchange unit 104 and a closed-loop anion exchange unit 108. The cation exchange unit 104 may be connected in series to the anion exchange unit 108 via an intermediate degasifier 112.

Produced water 116 to be treated by the produced water purification system 100 may be stored in a feed tank (not shown). The produced water 116 may be subject to pretreatment and controls in the feed tank. For instance, the produced water 116 may be filtered to remove organic contaminants and dissolved solids. The produced water 116 may be flowed through the cation exchange unit 104 to remove cations present in the produced water 116. In one or more embodiments, the cations present in the produced water 116 may primarily comprise sodium (Na+). The produced water 116 may have Na+ content of 600 to 2,400 mg/L Na, a Cl+ content of 300 to 2,000 mg/L Cl and carbonate of 1,000 to 2,800 mg/L $CO_3$.

The Na+ ions in the produced water 116 may be exchanged for hydrogen (H+) ions in a packed cation resin bed of the cation exchange unit 104. The cation exchange unit 104 is described in more detail below with reference to FIG. 2.

The decationized water 120, which may be slightly acidic with a pH under 2.0, may be discharged from the cation exchange unit 104. In one or more embodiments, the decationized water 120 may comprise anions, primarily bicarbonate and chloride ions. The decationized water 120 may have an excess of hydrogen ions which lowers the pH of the decationized water 120. The pH may be lowered from about 7.5-8.5 to about 1.4 to 2.5. In the lowered pH range, the bicarbonate ions in the decationized water may react with the hydrogen ions and produce carbon dioxide gas, as illustrated by the following equation:

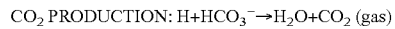

$$CO_2 \text{ PRODUCTION: } H+HCO_3^- \rightarrow H_2O+CO_2 \text{ (gas)}$$

The discharged decationized water 120 may be flowed to an intermediate degasifier 112. In one or more embodiments, the degasifier 112 may be a forced draft gas stripper. The degasifier 112 may be used to release carbon dioxide gas from the discharged decationized water 120, thereby reducing the dissolved solids content of the decationized water 120. In one or more embodiments, the released carbon dioxide may be beneficially recovered as a purified carbonate salt byproduct using a combined gas stripper/absorber system (not shown) thereby also reducing the emission of deleterious greenhouse gases. In one embodiment, the carbon dioxide that has been released may be passed through an absorption unit (not shown) comprising soda lime to produce calcium carbonate which may be used as a fertilizer.

The degasified water 124 may be discharged from the degasifier 112 and flowed to the anion exchange unit 108 to remove anions present in the degasified water 124. In one or more embodiments, the anions present in the degasified water 124 may primarily comprise chloride (Cl−) ions. The anion exchange unit 108 is described in more detail below with reference to FIG. 3.

Purified water 128, having a neutral pH and "deionized" of both cations and anions, may be discharged from the anion exchange unit 108. In one or more embodiments, the discharged purified water 128 may be subject to one or more further treatment steps (not shown). The purified water 128 may have less than 50 mg/L Na+ and 50 mg/L Cl−.

In one or more embodiments, the produced water purification system 100 may further comprise one or more recycle streams (e.g., recycle streams 132a-c). As described below with reference to FIGS. 2-4, it should be understood that the cation exchange unit 104 and the anion exchange unit 108 may produce a plurality of effluents. In other words, the produced water purification system 100 is not limited to the discharged decationized water 120, degasified water 124, and purified water 128 effluents described above with reference to FIG. 1. Moreover, any combination of one or more influents and/or effluents may be used as slip streams (recycle streams or otherwise) leading to any portion of the water purification system 100 thus suitable to optimize, among other desirable efficiency parameters, process, resource, environmental, and/or economic efficiency.

Figure 2:
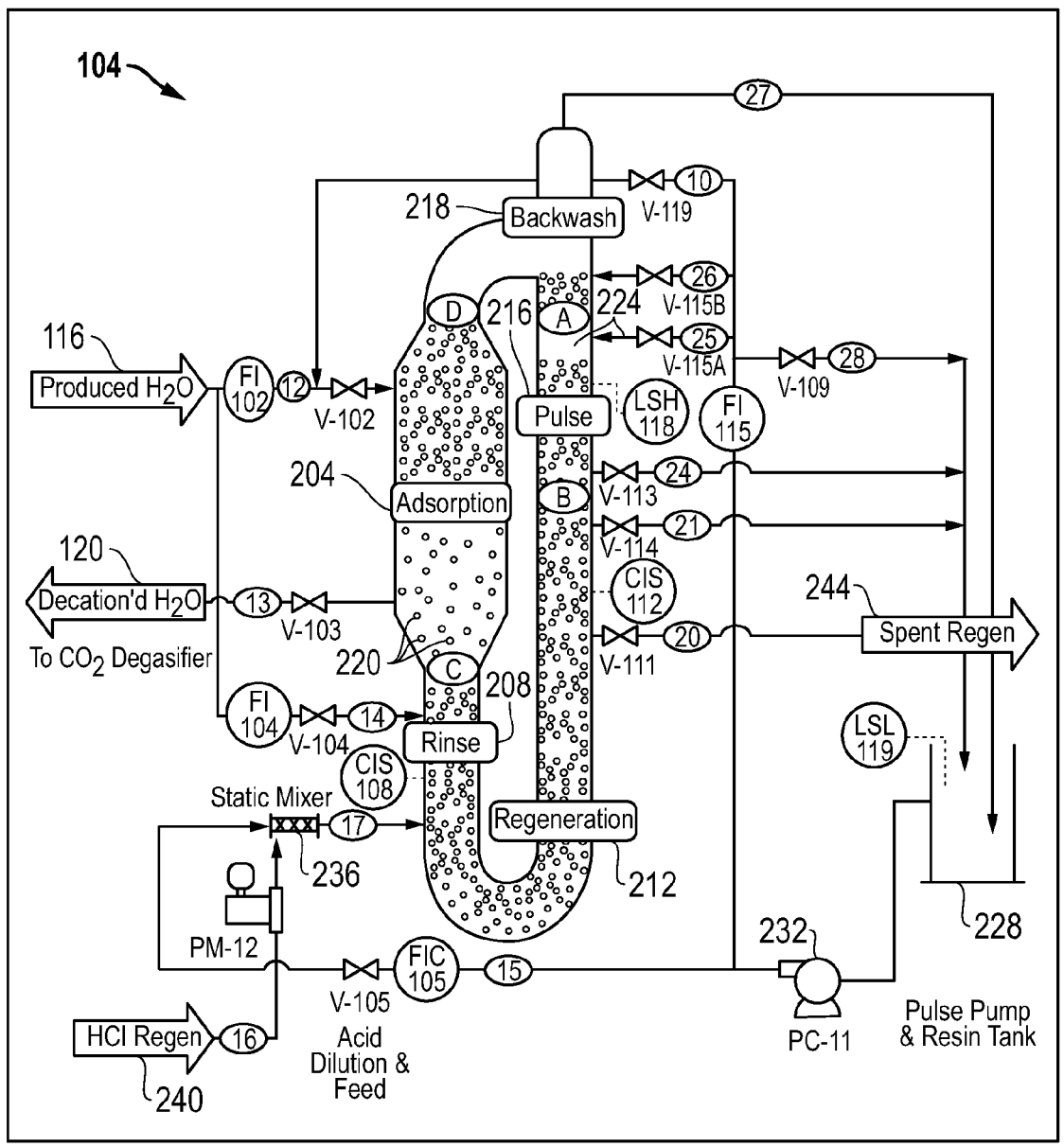
FIG. 2 shows a flow diagram illustrating systems and processes in accordance with one or more embodiments of the present invention.

Referring now to FIG. 2, in accordance with one or more embodiments of the present invention, the cation exchange unit 104 may be a closed-loop continuous countercurrent exchange unit (e.g., a Higgins Loop™ closed-loop contactor), comprising an adsorption zone 204, a rinse zone 208, a regeneration zone 212, a pulse zone 216, and a backwash zone 218.

The cation exchange unit 104 may further comprise internal butterfly valves A-D, and external valves V102-V119.

The produced water 116 flowed to the cation exchange unit 104 may comprise any solution having ions that need to be removed from the solution. For example, in one or more embodiments, the produced water 116 may comprise water produced as a result of extracting coal seam gas (CSG). The produced water 116 may comprise a high content of sodium bicarbonate and/or sodium chloride, which, if discharged to the environment, may harm plant and animal life.

The produced water 116 may be flowed down through the adsorption zone 204 of the cation exchange unit 104, which comprises at least a portion of the packed bed of cation resin 220 in the cation exchange unit 104. In one or more embodiments, the produced water 116 may flow down the adsorption zone 204 in a counterclockwise direction with respect to the cation exchange unit 104.

Contact between the produced water 116 and the cation resin 220 as the produced water flows down the adsorption zone 204 may cause an exchange of ions, resulting in the removal of cations, primarily Na+, from the produced water 116. In one or more embodiments, the cation resin bed 220 may comprise a strong acid cation resin bed. The exchange of ions ("cation adsorption") may occur between the Na+ ions in the produced water 116 for the H+ ions on the cation resin 220. The cation adsorption is illustrated by the following chemical equation, where "R—" represents the resin 220:

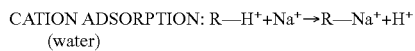
CATION ADSORPTION: R—H⁺+Na⁺→R—Na⁺+H⁺ (water)

Referring FIGS. 1-2, the decationized water 120 may be discharged from the adsorption zone 204 and flowed to the intermediate degasifier 112.

Cation adsorption may exhaust the cation resin 220 in the adsorption zone 204, i.e., in time, at least a portion of the resin 220 may have diminished or no capacity to exchange ions with the produced water 116 flowing through the adsorption zone 204. When this happens, in one or more embodiments, a volume of fluid 224 is pumped into the pulse zone 216 to advance the cation resin 220 below the adsorption zone 204 and replace the exhausted resin 220.

By pulsing fluid 224 such that it travels in a clockwise direction (with respect to the cation exchange unit 104) through the pulse zone 216, the fluid 224 may displace the cation resin 220 disposed downstream of the pulsed fluid 224, thereby replacing the exhausted resin 220 with resin 220 advanced from below the adsorption zone 204. As described in more detail below, cation resin 220 may be regenerated in the regeneration zone 212.

In one or more embodiments, the fluid 224 may comprise water. The fluid 224 may be stored in a tank 228. A pump 232 may be used to pulse the fluid 224 from the tank 228 to, for example: the pulse zone 216 via stream routes 10-to-25 and 10-to-26; the produced water 116 entering the adsorption zone 204 via stream route 10-to-12; and, for diluting acid supplied to the regeneration zone 212, to a mixer via stream 15. The tank may receive pulsing fluid from one or more of a variety of sources, such as, for example, produced water 116 via stream route 12-to-10-to-28, backwash 218 via stream 27, and spent pulsing fluid 224 via stream routes 24-to-28 and 21-to-28.

In one or more embodiments, valves B, C, and D may be open during the pulse stage, and valve A may be closed. During the cation adsorption stage, all of valves A-D may be closed to avoid cross-contamination between the zones.

Prior to advancement to the adsorption zone 204, exhausted resin 220 residing in the regeneration zone 212 may be regenerated for suitable ion exchange use in the adsorption zone 204. Within the regeneration zone 212, a resin regeneration stream 17 may be moved through the resin 220 in a counter-clockwise direction with respect to the cation exchange unit 104 (as is the produced water 116 stream).

Cation resin bed performance may be detected by measuring one or more physical properties of the fluids in the various zones in the cation exchange unit 104. The measurements may be made with any combination of location, frequency and duration. Any single physical property, or combination of physical properties, of cation exchange unit fluids may be measured including pH and conductivity.

In one or more embodiments, the resin regeneration stream 17 may comprise an acid regenerant 240. The acid regenerant 240 may comprise an acid selected from a group consisting of: HCl, $H_2SO_4$, $HNO_3$, $H_3PO_4$, and $H_2CO_3$, citric acid, methane sulfonic acid and acetic acid. The acid regenerant 240 may be stored in a storage tank (not shown) and may be recycled back to the cation exchange unit 104. In one embodiment, the acid regenerant 240 may be pumped out of the storage tank and into a static mixer (not shown) that meters the flow of acid regenerant into the cation exchange unit 104.

The acid regenerant 240 added to the resin 220 may restore the hydrogen ion content of the resin 220, as illustrated by the following chemical equation:

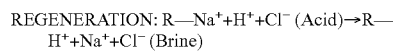
REGENERATION: R—Na⁺+H⁺+Cl⁻ (Acid)→R—H⁺+Na⁺+Cl⁻ (Brine)

The resulting brine/spent regenerant 244, may be piped out of the cation exchange unit 104 via stream 20.

In one or more embodiments, with reference to FIGS. 1-2, the degasified water 124, free of bicarbonate, may be recycled via stream 136 to be used as strong acid hydrochloric acid regenerant 240, thereby minimizing or preventing carbon dioxide gas evolution within the cation resin bed 220.

In one or more embodiments, the regenerated cation resin 220 may be rinsed to remove excess acid regenerant 240 therefrom prior to advancement to the adsorption zone 204. The rinsing may occur in a rinse zone 208 disposed between the adsorption zone 204 and the regeneration zone 212. A stream 20 of the produced water 116 may be diverted from stream 12 and used to rinse the regenerated cation resin 220.

Figure 3:
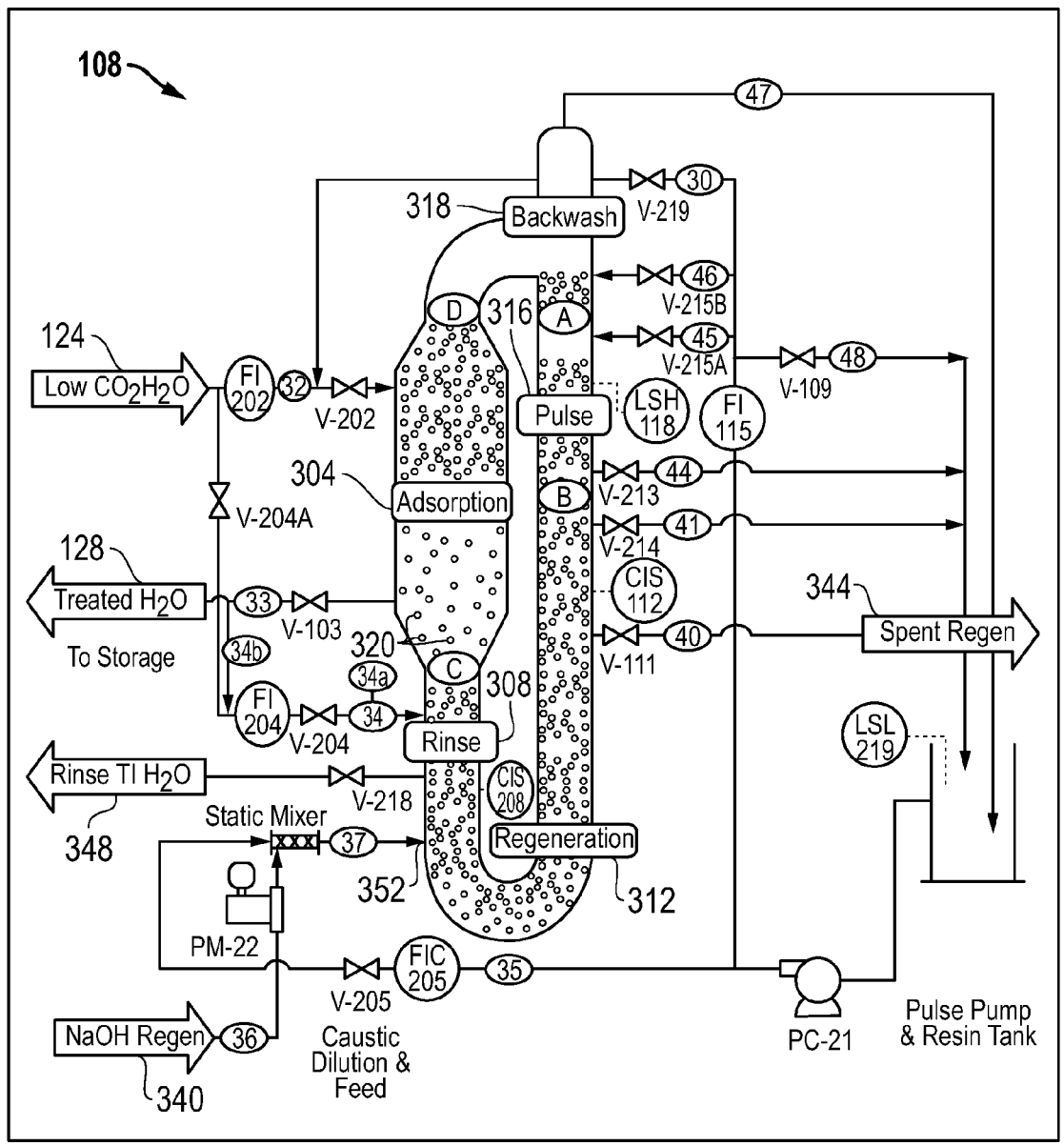
FIG. 3 shows a flow diagram illustrating systems and processes in accordance with one or more embodiments of the present invention.

Referring to FIG. 3, in accordance with one or more embodiments of the present invention, the anion exchange unit 108 may be a closed-loop continuous countercurrent exchange unit (e.g., a Higgins Loop™ closed-loop contactor), comprising an adsorption zone 304, a rinse zone 308, a regeneration zone 312, a pulse zone 316, and a backwash zone 318.

As discussed above with reference to FIGS. 1-2, the discharged decationized water 120 may be flowed to an intermediate degasifier 112, which may be used to release carbon dioxide gas (and beneficially recover it as a purified carbonate salt) from the discharged decationized water 120, thereby reducing the decationized water's 120 dissolved solids content.

The degasified water 124 may be discharged from the degasifier 112 and flowed to the anion exchange unit 108 to remove anions present in the degasified water 124. In one or more embodiments, the anions present in the degasified water 124 may primarily comprise bicarbonate and chloride.

The degasified water 124, still acidic, may be flowed down through the adsorption zone 304 of the anion exchange unit 108, which comprises at least a portion of the packed bed of anion resin 320 in the anion exchange unit 108. In one or more embodiments, the degasified water 124 may flow down the adsorption zone 304 in a counterclockwise direction with respect to the anion exchange unit 108.

Contact between the degasified water 124 and the anion resin 320 as the degasified water flows down the adsorption zone 304 may cause an exchange of ions, resulting in the removal of anions, primarily Cl−, from the degasified water 124. In one or more embodiments, the anion resin bed 320 may comprise a weak base anion resin bed. The exchange of ions ("anion adsorption") may occur between the Cl− ions in the degasified water 124 for the H ions on the anion resin 320. The anion adsorption is illustrated by the following chemical equation, where "R—" represents the resin 320:

ANION ADSORPTION: R—OH+HCl→R—Cl⁻+ H₂O (water)

Purified water 128, having a neutral pH and "deionized" of both cations and anions, may be discharged from the adsorption zone 304. In one or more embodiments, the discharged purified water 128 may be flowed to one or more further treatment steps (not shown).

Anion adsorption may exhaust the anion resin 320 in the adsorption zone 304. When this happens, in one or more embodiments, the regeneration zone 312 and the pulse zone 316 are utilized to advance regenerated anion resin 320 to the adsorption zone 304 in processes similar to those described above with reference to the corresponding regeneration zone 212 and pulse zone 216 of the cation exchange unit 104. However, rather than using an acid regenerant 240 as in the cation exchange unit 104, the anion exchange unit 108 contacts the exhausted resin 320 with a concentrated alkali (caustic) regenerant 340, for example, NaOH, as illustrated by the following chemical equation:

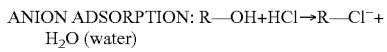

REGENERATION: R—Cl+NaOH (alkali)→R—OH+ NaCl (Brine)

In some embodiments, the caustic regenerant may include NaOH, soda ash, calcium carbonate, sodium bicarbonate, magnesium hydroxide, lime (Ca(OH)₂) and any derivatives of the aforementioned. The caustic may be NaOH of concentrated commercial grade. In some embodiments, the caustic regenerant may be the product of purification and conversion of either, or both of, acidic and caustic brine discharged from the cation and anion exchange units, respectively.

Anion resin bed performance may be detected by measuring one or more physical properties of the fluids in the various zones in the anion exchange unit 108. Any single, or combination of, physical property or physical properties of anion exchange unit fluids may be measured including pH and conductivity.

The resulting brine/spent regenerant 344, an alkaline solution of sodium chloride which may be heavily concentrated with Cl ions, may be piped out of the anion exchange unit 108 via stream 40. In one or more embodiments, this stream 40 may comprise a volume less than about 1.0% of the purified water 120 volume.

In one or more embodiments, the regenerated anion resin 320 may be rinsed to remove excess caustic regenerant 340 therefrom prior to advancement to the adsorption zone 304. The rinsing may occur in a rinse zone 308 disposed between the adsorption zone 304 and the regeneration zone 312.

In one or more embodiments, rinsing the regenerated anion resin 320 may comprise a two-stage rinsing system/process.

In a first stage, a slip stream 34a of the acidic degasified water 124 may be flowed through the rinse zone 308 to rinse the regenerated anion resin 320 of its caustic regenerant 340 by displacing and neutralizing the residual caustic with the degasified water's 124 free acidity.

In a second stage, a slip stream 34b of deionized purified water 128 may be flowed through the rinse zone 308 to rinse the residual acidic degasified water 124 from the regenerated anion resin 320 to ensure that when to-be-treated degasified water 124 enters the adsorption zone 304, the discharged purified water 128 will be low in acidity.

In one or more embodiments, the rinse water may be discharged from the rinse zone 308 through an outlet collector called a "rinse tail" 348. The rinse tail 348 may be disposed above the caustic regenerant 340 inlet 352 to prevent excessive dilution of the spent caustic regenerant 344. The rinse tail 348 water may contain some sodium and chloride, and may be recycled to the produced water 116 stream entering the cation exchange unit 104.

Conventional ion exchange design typically uses a high volume of rinse water to flush residual caustic from the resin bed. The two-stage rinse processes of the present invention may reduce rinse time and minimize the volume of rinse water by using the acidic degasified water 124 to neutralize residual caustic. The rinse tail 348 may provide a means of thorough rinsing while not diluting the caustic regenerant 340 or adding to the waste volume generated.

Referring to FIGS. 1-3, one or more embodiments of the produced water purification system 100 may be used to treat a waste stream or concentrate from a RO process. As described earlier, RO may be used to treat produced water at some sites. However, the RO concentrate needs to be further treated through the Higgins Loop™ in order to convert the salt in the RO concentrate into a beneficial byproduct. The RO concentrate may also be hazardous to the environment because of its contaminants. For example, the RO concentrate may have high levels of bicarbonate. The RO concentrate may be stored in a feed tank (not shown). A large volume of the discharged purified deionized water 128 may be recycled internally, for example, via stream 132c, to the feed tank to dilute the RO concentrate prior to flowing it to the cation exchange unit 104 for further treatment. Diluting the RO concentrate in this manner may mitigate excessive evolution of carbon dioxide (due to its high levels of bicarbonate) in the cation exchange unit 104. Treatment of the RO concentrate in the cation exchange unit 104 may further produce a value added brine stream. The brine stream may be suitable as a feedstock for either salt or chlor-alkali production.

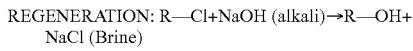

In one or more embodiments, the anion resin bed 320 may be scrubbed with a caustic brine solution as an inline process. The caustic brine solution may comprise the caustic regenerant 340. The caustic brine solution may be collected in a storage tank and, as needed, used to treat biofouling, by feeding it through a static mixer and line and to the regeneration zone of the anion exchange unit 108.

The internal scrubbing may preclude the necessity of production downtime and resin removal to conduct an offline process to rejuvenate the Cl-loaded resin 320 of organic contaminant buildup, thereby, reducing biofouling within the regeneration zone 312 of the anion exchange unit 108.

Figure 4:
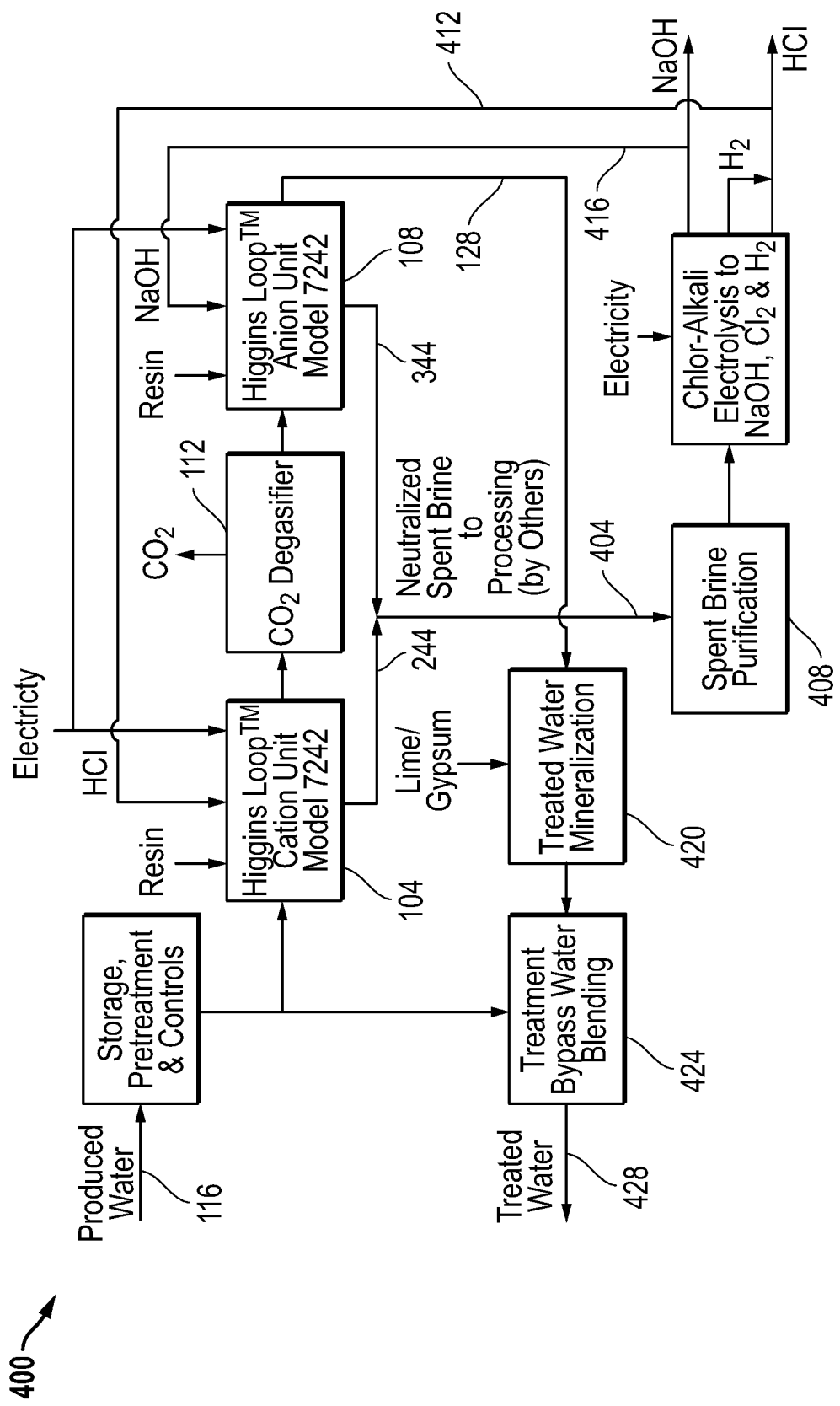
FIG. 4 shows a flow diagram illustrating systems and processes in accordance with one or more embodiments of the present invention.

Referring now to FIG. 4, in accordance with one or more embodiments of the present invention, a produced water purification system 400 may comprise a closed-loop cation exchange unit 104 and a closed-loop anion exchange unit 108, and an intermediate degasifier 112, as described above with reference to FIGS. 1-3.

In one or more embodiments, the produced water may comprise elevated levels of total dissolved solids, Na+, carbonate, and Cl⁻ ions.

The brine/spent regenerant 244, 344 discharged from the cation exchange unit 104 and the anion exchange unit 108 may be combined into a solution and flowed via brine stream 404. The dissolved solids in the pre-treated produced water are concentrated into a combined 20% in the brine stream 404 having a volume of less than 2- (and) ½% of the pre-treated produced water. The concentrated brine stream 404 may be suitable as feedstock to produce additional byproducts. The concentrated brine stream 404 may be sent to further processing 408, where it may be purified, concentrated, and converted into acid and caustic. In some embodiments, the conversion may be by electrolysis The products resulting from the further processing 408 may comprise NaOH, HCl, and/or $H_2$. Produced acid may be recycled via stream 412 to the cation exchange unit 104 to be used as acid regenerant 240, and produced caustic may be recycled via stream 416 to the anion exchange unit 108 to be used as caustic regenerant 340.

The purified deionized water 128 may be flowed to further processing 420, where it may be further treated with calcium salt addition (either or both of lime and gypsum, for example) to buffer it prior to discharge. In one or more embodiments, the purified deionized water 128 may further be blended with untreated produced water 424, producing treated water 428.

One or more embodiments of the produced water purification system 100 may be fully automated and designed for unattended operation. The produced water purification system 100 may comprise in line instrumentation (not shown) to monitor and adjust feed parameters and flow volumes. The produced water purification system 100 may be remotely controlled and monitored. Daily site visits may be required to visually check on the components of the produced water purification system 100.

Although the term "system" (and its plural form) may be used in the above description with reference to FIGS. 1-4, these figures (and their corresponding detailed descriptions) are to be recognized as also illustrating and describing embodiments of the processes of the present invention.

Figure 5:
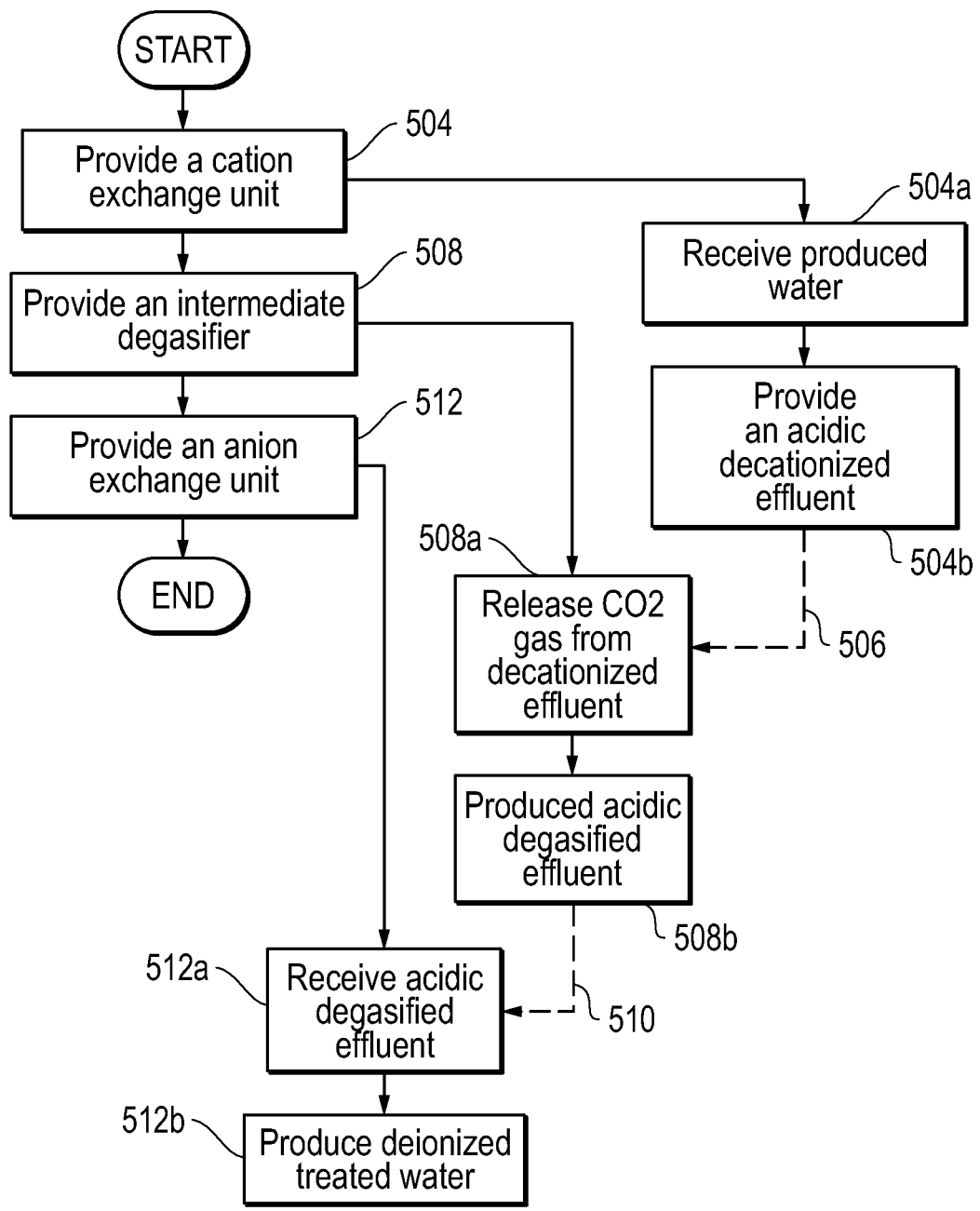
FIG. 5 shows a flow chart illustrating processes in accordance with one or more embodiments of the present invention.

Notwithstanding the foregoing, FIG. 5 generally illustrates processes in accordance with one or more embodiments of the present invention.

In steps 504, 508, and 512, respectively, a cation exchange unit, an intermediate degasifier, and an anion exchange unit are provided.

In step 504a, the cation exchange unit may receive produced water to be treated. The produced water may be flowed through the adsorption zone of the cation exchange unit to remove cations comprising Na+ from the produced water and produce an acidic decationized effluent (step 504b).

In step 506, the acidic decationized effluent may be discharged from the adsorption zone of the cation exchange unit and flowed to the intermediate degasifier. The degasifier may, in steps 508a-508b, strip and release carbon dioxide gas from the acidic decationized effluent, producing an acidic degasified effluent.

In step 510, the acidic degasified effluent may be discharged from the intermediate degasifier and flowed to the anion exchange unit. In step 512a, the acidic degasified effluent may be received and flowed through the adsorption zone of the anion exchange unit, producing deionized treated water (step 512b).

In the regeneration zone of the anion exchange unit, the anion resin bed may be regenerated by contacting it with a caustic regenerant. The regenerated anion resin bed may be rinsed in the rinse zone using a two-stage process. The two-stage rinse process involves: in a first stage, piping a slip stream flow of the acidic degasified effluent through the rinse zone of the anion exchange unit; and, in a second stage, passing a stream of the deionized treated water through the rinse zone of the anion exchange unit.

In or more embodiments of the invention, the produced water feed streams and the various effluents and spent brine are sampled and analyzed on a routine basis.

The one or more embodiments of the invention may provide several economic and environmental benefits. There is a 50% reduction in regenerant chemical usage in the countercurrent ion exchange units of the invention as compared to chemical usage in normal ion exchange units. The TDS content in pre-treated produced water is reduced by over 30% by degasifying the decationized produced water thereby reducing chemical usage and waste brine volumes. The purified water is suitable for discharge into the environment, for irrigation or livestock and for use as potable drinking water.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A process for purification of produced water, the process comprising:
   providing a closed loop cation exchange unit and a closed loop anion exchange unit, the cation exchange unit and the anion exchange unit connected in series through an intermediate degasifier,
   the cation exchange unit comprising a cation resin bed,
   the anion exchange unit comprising an anion resin bed,
   each of the exchange units further comprising a plurality of treatment zones, the treatment zones comprising at least an adsorption zone, a rinse zone, a regeneration zone, a pulsing zone and a backwash zone;
   flowing a volume of the produced water through the adsorption zone of the cation exchange unit to remove cations comprising Na+ from the produced water and produce an acidic decationized effluent;
   in the regeneration zone of the cation exchange unit, regenerating the cation resin bed by contacting it with an acid regenerant;
   in the degasifier, releasing carbon dioxide gas from the acidic decationized effluent to produce an acidic degasified effluent;
   producing deionized treated water having a neutral pH by flowing a volume of the acidic degasified effluent through the adsorption zone of the anion exchange unit, and
   in the regeneration zone of the anion exchange unit, regenerating the anion resin bed by contacting it with a caustic regenerant,
   wherein the regenerated anion resin bed is rinsed in a two-stage process, comprising:

i) in a first stage, piping a slip stream flow of the acidic degasified effluent through the rinse zone of the anion exchange unit; and
ii) in a second stage, passing a stream of the deionized treated water through the rinse zone of the anion exchange unit,
wherein after the anion resin bed is regenerated, acidic degasified effluent and the deionized treated water which were used in the anion resin rinsing zone are collected and discharged through a rinse tail outlet collector as a rinse tail stream, wherein the rinse tail outlet collector is positioned within the rinse zone and above a caustic regenerant inlet distributor to prevent dilution of the caustic regenerant while rinsing the anion resin bed,
wherein the rinse tail outlet collector and the caustic regenerant inlet distributor are located in a portion of the closed loop anion exchange unit where the resin moves upwardly, and
wherein the rinse zone is positioned between the adsorption zone and the regeneration zone.

2. The process of claim 1, further comprising recycling the acidic degasified effluent from the rinse tail to a feed tank.

3. The process of claim 1, further comprising regenerating the cation resin bed by diverting a stream of the acidic degasified effluent for preventing the evolution of carbon dioxide gas within the cation resin bed.

4. The process of claim 1, wherein the acid regenerant is selected from the group consisting of HCl, $H_2SO_4$, $HNO_3$, $H_3PO_4$, $H_2CO_3$, citric acid, methane sulfonic acid and acetic acid.

5. The process of claim 1, wherein the cation resin bed further comprises a strong acid cation resin bed.

6. The process of claim 1, wherein the anion resin bed further comprises a weak base anion resin bed.

7. The process of claim 1, further comprising an inline process for inhibiting biofouling and/or treating biofoulant within the regeneration zone of the anion exchange unit, the inline process comprising scrubbing the anion resin bed with a caustic brine solution.

8. The process of claim 1, wherein upon the condition that the produced water is pre-treated using reverse osmosis (RO) and a RO concentrate is produced, the process further comprises:
   a. storing the RO concentrate in a feed tank; and
   b. recycling a sufficiently large volume of the deionized treated water internally to the feed tank to dilute the RO concentrate.

9. The process of claim 8, wherein the RO concentrate dilution is for mitigating an excessive evolution of carbon dioxide in the cation exchange unit.

10. The process of claim 1, wherein at least one of the anion exchange unit and the cation exchange unit operates with continuous counter-current flow.

11. The process of claim 1, wherein the produced water comprises elevated levels of total dissolved solids, Na+, carbonate and Cl− ions.

12. The process of claim 1, further comprising adding calcium salt to the deionized treated water to buffer it prior to discharge.

13. A process for purification of produced water, the process comprising:
   providing a closed loop cation exchange unit and a closed loop anion exchange unit, the cation exchange unit and the anion exchange unit connected in series through an intermediate degasifier,
   the cation exchange unit comprising a cation resin bed,
   the anion exchange unit comprising an anion resin bed,
   each of the exchange units further comprising a plurality of treatment zones, the treatment zones comprising at least an adsorption zone, a rinse zone, a regeneration zone, a pulsing zone and a backwash zone;
   flowing a volume of the produced water through the adsorption zone of the cation exchange unit to remove cations comprising Na+ from the produced water and produce an acidic decationized effluent comprising carbon dioxide gas;
   in the regeneration zone of the cation exchange unit, regenerating the cation resin bed by contacting it with an acid regenerant;
   discharging a spent acidic brine solution from the regeneration zone of the cation exchange unit;
   in the degasifier, releasing the carbon dioxide gas from the cation exchange unit acidic effluent to produce an acidic degasified effluent;
   regenerating the cation resin bed by further diverting a stream of the acidic degasified effluent, the acidic degasified effluent controlling the evolution of carbon dioxide within the cation resin bed;
   producing deionized treated water having a neutral pH by flowing a volume of the acidic degasified effluent through the adsorption zone of the anion exchange unit;
   in the regeneration zone of the anion exchange unit, regenerating the anion resin bed by contacting it with a caustic regenerant;
   rinsing the regenerated anion resin bed in a two-stage process, the process comprising:
   i) in a first stage, piping a slip stream flow of the acidic degasified effluent through the rinse zone of the anion exchange unit; and
   ii) in a second stage, passing a stream of the deionized treated water through the rinse zone of the anion exchange unit, and
   iii) discharging a spent caustic brine solution from the regeneration zone of the anion exchange unit,
   wherein after the anion resin bed is regenerated, acidic degasified effluent and the deionized treated water which were used in the anion resin rinsing zone are collected and discharged through a rinse tail outlet collector as a rinse tail stream, wherein the rinse tail outlet collector is positioned within the rinse zone and above a caustic regenerant inlet distributor to prevent dilution of the caustic regenerant while rinsing the anion resin bed,
   wherein the rinse tail outlet collector and the caustic regenerant inlet distributor are located in a portion of the closed loop anion exchange unit where the resin moves upwardly, and
   wherein the rinse zone is positioned between the adsorption zone and the regeneration zone.

14. The process of claim 13, further comprising combining the spent acidic brine solution and the spent alkaline brine solution into a solution, and purifying the combined brine solution.

15. The process of claim 14, further comprising converting the purified brine solution into an acid and caustic, a portion of the acid recycled to the cation exchange unit and a portion of the caustic recycled to the anion exchange unit.

16. A process for purification of produced water, the process comprising:
   providing a closed loop cation exchange unit and a closed loop anion exchange unit, the cation exchange unit and the anion exchange unit connected in series through an intermediate degasifier,
   the cation exchange unit comprising a cation resin bed,
   the anion exchange unit comprising an anion resin bed, each of the exchange units further comprising a plurality of treatment zones, the treatment zones comprising at least an adsorption zone, a rinse zone, a regeneration zone, a pulsing zone and a backwash zone;

flowing a volume of the produced water through the adsorption zone of the cation exchange unit to remove cations comprising Na+ from the produced water and produce an acidic decationized effluent comprising carbon dioxide gas;

in the regeneration zone of the cation exchange unit, regenerating the cation resin bed by contacting it with an acid regenerant;

discharging a spent acidic brine solution from the regeneration zone of the cation exchange unit;

in the degasifier, releasing the carbon dioxide gas from the cation exchange unit acidic effluent to produce an acidic degasified effluent;

facilitating recovery of the released carbon dioxide gas as a carbonate salt byproduct;

producing deionized treated water having a neutral pH by flowing a volume of the acidic degasified effluent through the adsorption zone of the anion exchange unit;

in the regeneration zone of the anion exchange unit, regenerating the anion resin bed by contacting it with a caustic regenerant;

rinsing the regenerated anion resin bed in a two-stage process, the process comprising:

i) in a first stage, piping a slip stream flow of the acidic degasified effluent through the rinse zone of the anion exchange unit; and ii) in a second stage, passing a stream of the deionized treated water through the rinse zone of the anion exchange unit, and iii) discharging a spent caustic brine solution from the regeneration zone of the anion exchange unit, wherein after the anion resin bed is regenerated, acidic degasified effluent and the deionized treated water which were used in the anion resin rinsing zone are collected and discharged through a rinse tail outlet collector as a rinse tail stream, wherein the rinse tail outlet collector is positioned within the rinse zone and above a caustic regenerant inlet distributor to prevent dilution of the caustic regenerant while rinsing the anion resin bed, wherein the rinse tail outlet collector and the caustic regenerant inlet distributor are located in a portion of the closed loop anion exchange unit where the resin moves upwardly, and wherein the rinse zone is positioned between the adsorption zone and the regeneration zone.

17. The process of claim 16, wherein upon the condition that the produced water is pre-treated using reverse osmosis (RO) and a RO concentrate is produced, the process further comprises:
   a. storing the RO concentrate in a feed tank; and
   b. recycling a sufficiently large volume of the deionized treated water internally to the feed tank to dilute the RO concentrate.

* * * * *